United States Patent
Nakamura et al.

(10) Patent No.: US 11,880,991 B2
(45) Date of Patent: Jan. 23, 2024

(54) IMAGING APPARATUS INCLUDING DEPTH INFORMATION AT FIRST OR SECOND SPATIAL RESOLUTION AT DIFFERENT REGIONS IN THE IMAGE

(71) Applicant: Panasonic Intellectual Property Management Co., Ltd., Osaka (JP)

(72) Inventors: Masatoshi Nakamura, Kyoto (JP); Motonori Ogura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/859,225

(22) Filed: Jul. 7, 2022

(65) Prior Publication Data

US 2023/0012208 A1    Jan. 12, 2023

(30) Foreign Application Priority Data

Jul. 12, 2021   (JP) ................. 2021-115043

(51) Int. Cl.
  *G06T 7/50*   (2017.01)
  *H04N 23/67*   (2023.01)
  (Continued)

(52) U.S. Cl.
  CPC ............. *G06T 7/50* (2017.01); *G06V 10/235* (2022.01); *G06V 10/25* (2022.01); *G06V 10/255* (2022.01); *H04N 23/611* (2023.01); *H04N 23/635* (2023.01); *H04N 23/67* (2023.01); *H04N 23/675* (2023.01); *G06T 2207/20016* (2013.01);
  (Continued)

(58) Field of Classification Search
  CPC ............. G06T 7/50; G06T 2207/20016; G06T 2207/20104; G06T 2207/30196; G06T 2207/10028; G06T 2207/20221; G06V 10/235; G06V 10/25; G06V 10/255; H04N 23/611; H04N 23/635; H04N 23/67; H04N 23/675; H04N 23/959
  See application file for complete search history.

(56) References Cited

U.S. PATENT DOCUMENTS

2015/0201121 A1   7/2015  Nobayashi
2016/0035099 A1   2/2016  Kawamura
  (Continued)

FOREIGN PATENT DOCUMENTS

JP   2014-063142 A   4/2014
JP   2019-074756 A   5/2019
  (Continued)

*Primary Examiner* — Gevell V Selby
(74) *Attorney, Agent, or Firm* — Renner, Otto, Boisselle & Sklar, LLP (57) ABSTRACT

An imaging apparatus includes: an image sensor that captures a subject image to generate image data; a first depth measurer that acquires first depth information indicating a depth at a first spatial resolution, the depth showing a distance between the imaging apparatus and a subject in an image indicated by the image data; a second depth measurer that acquires second depth information indicating the depth in the image at a second spatial resolution different from the first spatial resolution; and a controller that acquires third depth information indicating the depth at the first or second spatial resolution for each region of different regions in the image, based on the first depth information and the second depth information.

9 Claims, 8 Drawing Sheets

(51) Int. Cl.
  *H04N 23/63*     (2023.01)
  *G06V 10/25*     (2022.01)
  *G06V 10/22*     (2022.01)
  *G06V 10/20*     (2022.01)
  *H04N 23/611*    (2023.01)

(52) U.S. Cl.
  CPC ............... *G06T 2207/20104* (2013.01); *G06T 2207/30196* (2013.01)

(56) References Cited

U.S. PATENT DOCUMENTS

2019/0025544 A1   1/2019  Watanabe
2019/0349513 A1  11/2019  Gunji
2022/0012905 A1*  1/2022  Matsumoto ............. G06T 7/593
2022/0222843 A1*  7/2022  Ota .................... G01B 11/2513

FOREIGN PATENT DOCUMENTS

JP     2019/198008 A   11/2019
WO   2015/128908 A1   9/2015

* cited by examiner

Fig. 3A CAPTURED IMAGE

Fig. 3B DFD DEPTH MAP

Fig. 3C PD DEPTH MAP

Fig. 3D COMBINED DEPTH MAP

IMAGING APPARATUS INCLUDING DEPTH INFORMATION AT FIRST OR SECOND SPATIAL RESOLUTION AT DIFFERENT REGIONS IN THE IMAGE

BACKGROUND

1. Technical Field

The present disclosure relates to an imaging apparatus having a depth measurement function of measuring a depth to a subject.

2. Related Art

JP 2014-063142 A discloses a depth detection device used for an imaging apparatus such as a digital camera. The depth detection device includes an arithmetic unit that detects a subject depth to a subject on the basis of a first signal (A image signal) generated by an image sensor due to a light flux passing through a first pupil region of an imaging optical system, and a second signal (B image signal) due to a light flux passing through a second pupil region different from the first pupil region of the imaging optical system. The arithmetic unit performs a first process of calculating a subject depth and the like based on the first signal and the second signal by a phase detection method, and a second process of calculating a subject depth and the like based on the first signal and the second signal that are the same as those in the phase detection method by a DFD method. In the image sensor of JP 2014-063142 A, a photoelectric converter as an A pixel and a photoelectric converter as a B pixel are arranged in each pixel.

SUMMARY

The present disclosure provides an imaging apparatus capable of accurately obtaining a depth to a subject.

An imaging apparatus according to the present disclosure includes: an image sensor that captures a subject image to generate image data; a first depth measurer that acquires first depth information indicating a depth at a first spatial resolution, the depth showing a distance between the imaging apparatus and a subject in an image indicated by the image data; a second depth measurer that acquires second depth information indicating the depth in the image at a second spatial resolution different from the first spatial resolution; and a controller that acquires third depth information indicating the depth at the first or second spatial resolution for each region of different regions in the image, based on the first depth information and the second depth information.

According to the imaging apparatus of the present disclosure, a depth to the subject can be accurately obtained.

DETAILED DESCRIPTION

In the following, an embodiment will be described in detail with reference to the drawings as appropriate. However, unnecessarily detailed descriptions will be omitted in some cases. For example, detailed descriptions of already well-known matters and repetition of descriptions of substantially the same configuration will be omitted in some cases. This is to prevent the following description from being unnecessary redundant and to facilitate those skilled in the art to understand the present disclosure. Note that the inventor(s) provides the accompanying drawings and the following description in order for those skilled in the art to fully understand the present disclosure, and does not intend to limit the subject matter described in the claims by the accompanying drawings and the following description.

First Embodiment

In a first embodiment, a digital camera having a depth measurement function by two types of depth measurement methods will be described as an example of an imaging apparatus according to the present disclosure.

1. Configuration

A configuration of a digital camera according to the first embodiment will be described with reference to FIGS. 1 and 2.

Figure 1:
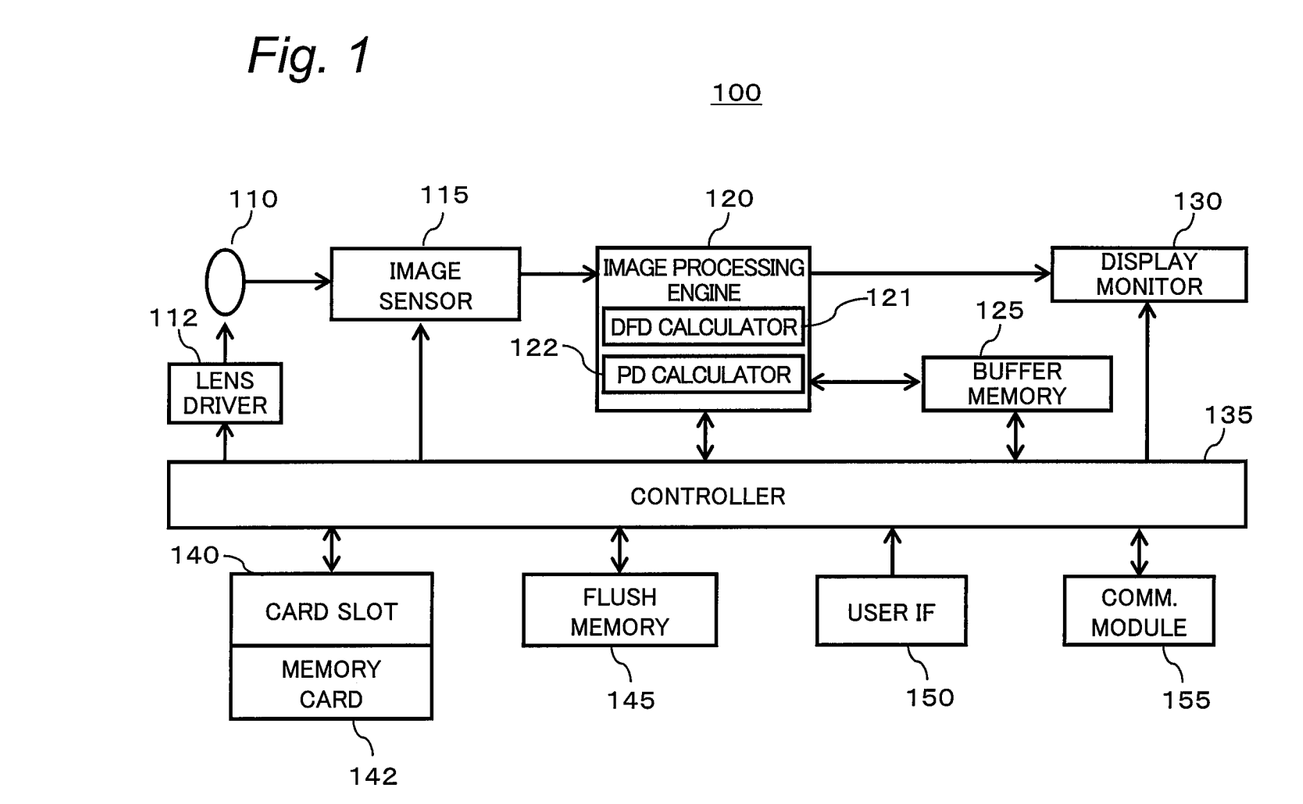
FIG. 1 is a diagram illustrating a configuration of a digital camera according to a first embodiment of the present disclosure.

FIG. 1 is a diagram illustrating a configuration of a digital camera 100 according to the present embodiment. The digital camera 100 of the present embodiment includes an image sensor 115, an image processing engine 120, a display monitor 130, and a controller 135. Further, the digital camera 100 includes a buffer memory 125, a card slot 140, a flash memory 145, a user interface 150, and a communication module 155. For example, the digital camera 100 further includes an optical system 110 and a lens driver 112.

The optical system 110 includes a focusing lens, a zooming lens, an optical camera-shake correction lens (OIS), a diaphragm, a shutter, and the like. The focusing lens is a lens for changing a focusing state of a subject image formed on the image sensor 115. The zooming lens is a lens for changing a magnification ratio of a subject image formed by the optical system. Each of the focusing lens and the like includes one or more lenses.

The lens driver 112 drives the focusing lens and the like in the optical system 110. The lens driver 112 includes a motor, and moves the focusing lens along an optical axis of the optical system 110 under the control of the controller 135. A configuration for driving the focusing lens in the lens driver 112 can be realized by a DC motor, a stepping motor, a servo motor, an ultrasonic motor, or the like.

The image sensor 115 captures a subject image formed via the optical system 110 to generate image-capturing data. The image-capturing data constitutes image data representing a captured image by the image sensor 115. For example, the image sensor 115 generates image data of new frames at a predetermined frame rate (e.g., 30 frames/second). The controller 135 controls a timing of generation of image-capturing data by the image sensor 115 and operation of an electronic shutter. As the image sensor 115, it is possible to use various image sensors such as a complementary metal-oxide semiconductor (CMOS) image sensor, a charge-coupled device (CCD) image sensor, and a negative-channel metal oxide semiconductor (NMOS) image sensor.

The image sensor 115 performs an image capturing operation of a still image, an image capturing operation of a through image, and the like. The through image is mostly a moving image and is displayed on the display monitor 130 for a user to determine a composition for image capturing of a still image. The through image and the still image are each an example of a captured image in the present embodiment. The image sensor 115 is an example of an image sensor in the present embodiment.

The image sensor 115 of the present embodiment includes sensor pixels 116 of an image plane phase detection method. FIG. 2 is a diagram for explaining the sensor pixels 116 in the image sensor 115.

Figure 2:
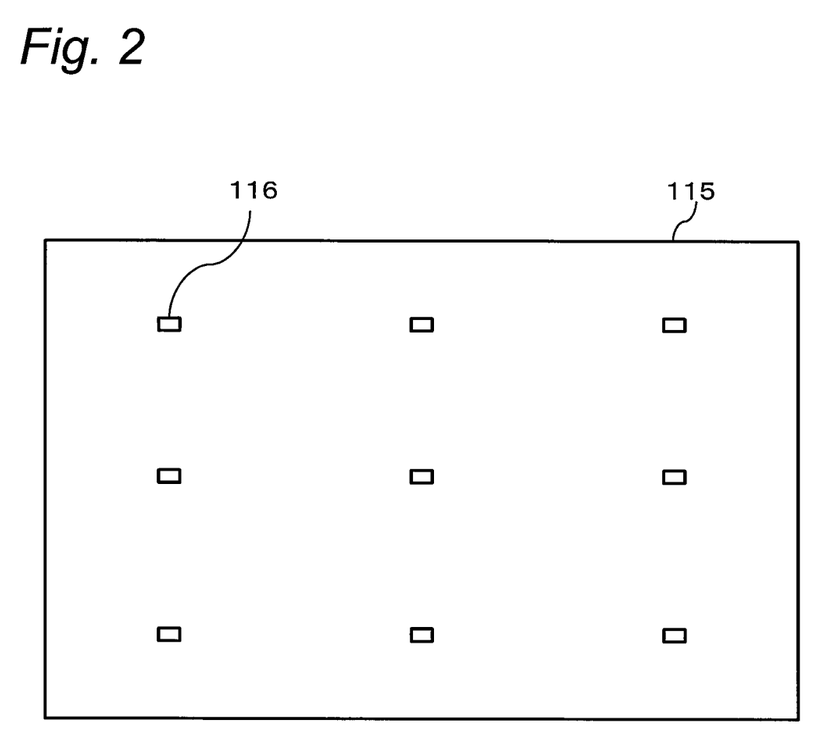
FIG. 2 is a diagram for explaining sensor pixels in an image sensor of the digital camera.

For example, as illustrated in FIG. 2, the sensor pixels 116 of the image plane phase detection method are arranged on an image plane of the image sensor 115 instead of pixels for image capturing. In other words, the image sensor 115 has pixels shielded from light in image capturing by the number of the sensor pixels 116. A plurality of the sensor pixels 116 are arranged at positions to be depth measurement targets, respectively, in a depth measurement function of the image plane phase detection method on the image plane of the image sensor 115, and constitute depth measurement points of the image plane phase detection method. For example, each of the sensor pixels 116 includes a photoelectric converter or the like divided so as to form two types of optical images obtained by pupil division in the optical system 110.

Returning to FIG. 1, the image processing engine 120 performs various processes on the image-capturing data output from the image sensor 115 to generate image data, or performs various processes on the image data to generate an image to be displayed on the display monitor 130. Examples of the various processes include, but are not limited to, interpolation processing of light-shielded pixels corresponding to the sensor pixels 116, white balance correction, gamma correction, YC conversion processing, electronic zoom processing, compression processing, expansion processing, and the like. The image processing engine 120 may be configured with a hard-wired electronic circuit, may be configured with a microcomputer or a processor using a program, or may be configured with other elements.

In the present embodiment, the image processing engine 120 includes a depth from defocus (DFD) calculator 121 that implements a depth measurement function of a DFD method, and a phase detection (PD) calculator 122 that implements a depth measurement function of the image plane phase detection method. In the present embodiment, the DFD calculator 121 is an example of a first depth measurer, and the phase detection calculator 122 is an example of a second depth measurer. Each of the calculators 121 and 122 includes an arithmetic circuit for each depth measurement function, for example. Each of the calculators 121 and 122 will be described later.

The display monitor 130 is an example of a display that displays various information. For example, the display monitor 130 displays an image (through image) represented by image data, which is captured by the image sensor 115 and is subjected to image processing of the image processing engine 120. The display monitor 130 further displays a menu screen for a user to set various settings of the digital camera 100 or other screens. The display monitor 130 can be configured with a liquid crystal display device or an organic electroluminescence (EL) device, for example.

The user interface 150 is a generic term for e.g. hardware keys such as operation buttons and operation levers provided on an outer casing of the digital camera 100 and receives an operation by a user. For example, the user interface 150 includes a shutter release button, a mode dial, and a touch panel. When receiving a user's operation, the user interface 150 transmits to the controller 135 an operation signal corresponding to the user's operation.

The controller 135 collectively controls an overall operation of the digital camera 100. The controller 135 includes a central processing unit (CPU) or the like, and the CPU executes a program (software) to realize predetermined functions. Instead of the CPU, the controller 135 may include a processor configured with a dedicated electronic circuit designed to realize predetermined functions. That is, the controller 135 can be realized by various processors such as a CPU, a microprocessor unit (MPU), a graphic processor unit (GPU), a digital signal processor (DSP), a field programmable gate array (FPGA), and an application specific integrated circuit (ASIC). The controller 135 may be configured with one or a plurality of processors. The controller 135 may be configured with one semiconductor chip together with the image processing engine 120 or other elements.

The buffer memory 125 is a recording medium that functions as a work memory of the image processing engine 120 and the controller 135. The buffer memory 125 is realized by a dynamic random access memory (DRAM) or other components. The flash memory 145 is a nonvolatile recording medium. Further, not shown in the drawings, the controller 135 may include various internal memories and may incorporate a read-only memory (ROM), for example. The ROM stores various programs to be executed by the controller 135. Furthermore, the controller 135 may incorporate a RAM that functions as a work area of the CPU.

The card slot 140 is a means by which a detachable memory card 142 is inserted. The card slot 140 can electrically and mechanically connect the memory card 142. The memory card 142 is an external memory including a recording element such as a flash memory therein. The memory card 142 can store data such as image data generated by the image processing engine 120.

The communication module 155 is a communication module (circuit) that performs communication conforming to the communication standard IEEE 802.11, the Wi-Fi standard, or the like. The digital camera 100 can communicate with other devices via the communication module 155. The digital camera 100 may directly communicate with another device via the communication module 155, or may communicate via an access point. The communication module 155 may be connectable to a communication network such as the Internet.

2. Operation

A description will be given below on the operation of the digital camera 100 configured as described above.

The digital camera 100 according to the present embodiment generates depth information indicating a depth to a subject with higher accuracy by combining two depth measurement techniques having different performances. An outline of the operation of the depth measurement function of the digital camera 100 will be described with reference to FIGS. 3A to 3D.

Figure 3A:
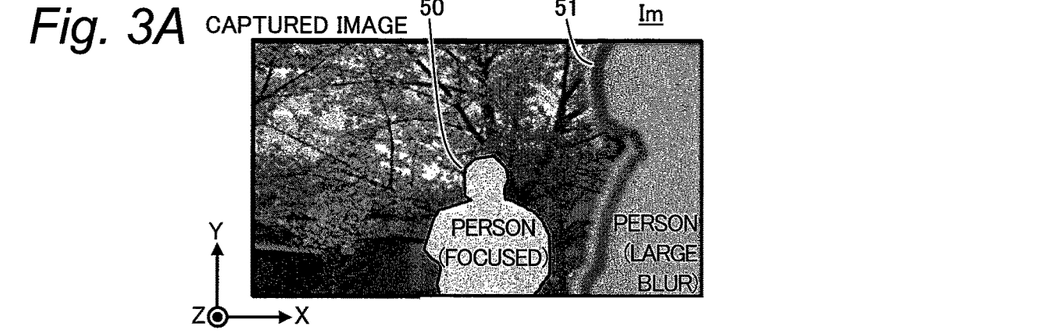
FIGS. 3A to 3D are a diagrams for explaining an outline of an operation of a depth measurement function of the digital camera.

FIG. 3A illustrates a captured image Im in the digital camera 100 of the present embodiment. The captured image Im constitutes one frame of various moving images including a through image, for example. Hereinafter, a horizontal direction in the captured image Im is defined as an X direction, and a vertical direction is defined as a Y direction. Further, a depth direction from the digital camera 100 to the subject may be referred to as a Z direction.

Figure 3B:
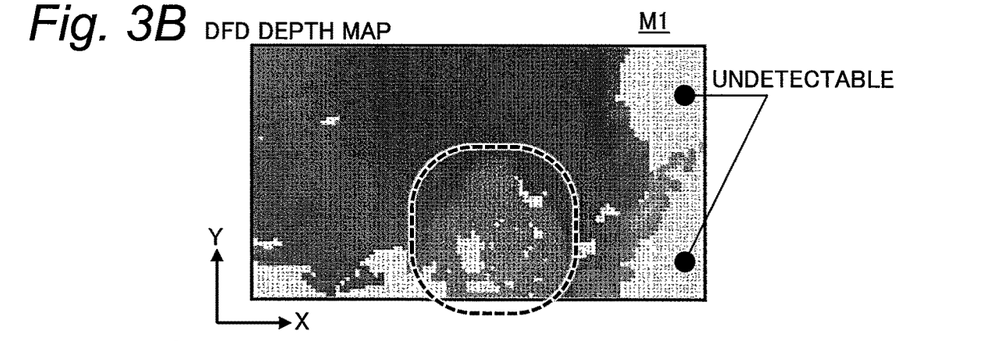
Figure 3C:
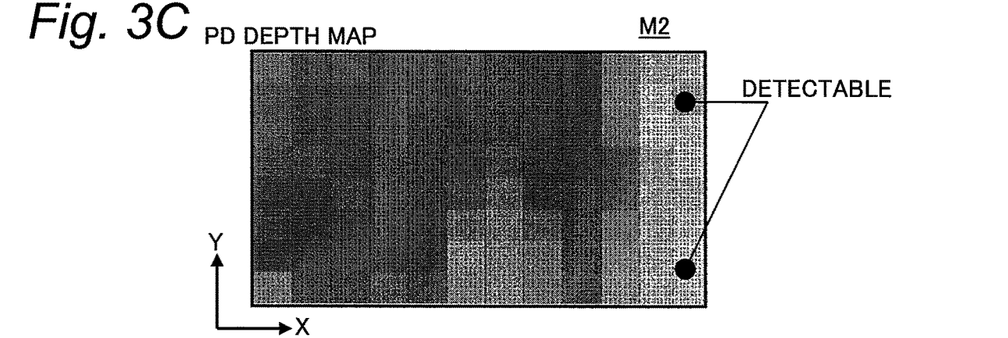
Figure 3D:
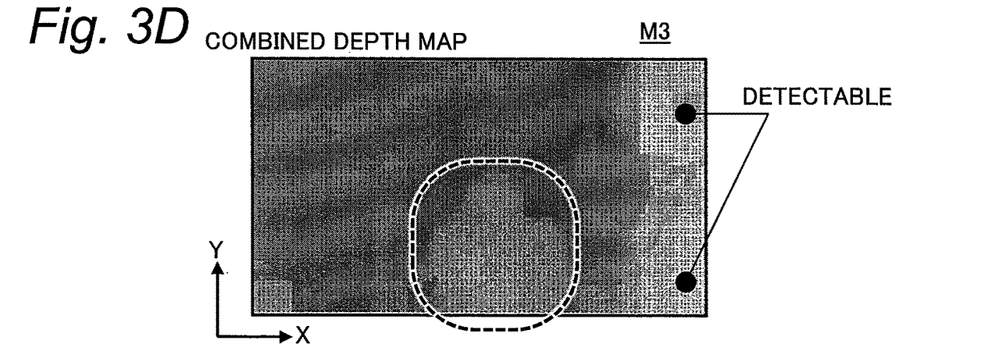

FIGS. 3B to 3D illustrate various depth maps M1 to M3 corresponding to the captured image Im of FIG. 3A, respectively. The depth maps M1 to M3 are examples of depth information indicating a depth measurement result for each depth measurement point in a two-dimensional coordinate system (X, Y) similar to the captured image Im, for example. In the depth maps M1 to M3 illustrated in FIGS. 3B to 3D, a depth value of the depth measurement result is shown by the shade of gray. As the gray is lighter, the depth is closer. As the gray is darker, the depth is farther.

The digital camera 100 according to the present embodiment performs depth measurement by the DFD method, to generate a DFD depth map M1 as illustrated in FIG. 3B, for example. The DFD depth map M1 is a depth map indicating a depth measurement result of the DFD method. Furthermore, the digital camera 100 according to the present embodiment further performs depth measurement by the image plane phase detection method, and generates a phase detection depth map M2 (FIG. 3C) indicating a result of this depth measurement.

As illustrated in FIG. 3B, the DFD depth map M1 has a relatively high spatial resolution, for example. The spatial resolution is various resolutions for detecting a spatial position of a subject in at least any direction in a three-dimensional space, for example. For example, the spatial resolution includes a two-dimensional resolution in the X and Y directions (i.e., the number of depth measurement points) and a resolution in the Z direction (i.e., a depth measurement accuracy).

FIGS. 3A to 3D illustrate an example in which two persons 50 and 51 are included in the subject in the captured image Im, and one person 50 is focused. In this example, the other person 51 is out of focus.

In the DFD depth map M1 of the present example, as illustrated in FIG. 3B, an outer shape of the focused person 50 appears. Thus, a subject such as the person 50 can be detected with high accuracy. On the other hand, the person 51 out of focus cannot be so detected. As described above, it is conceivable that a depth measurement accuracy of the DFD depth map M1 may be obtained with high accuracy only in a depth range close to a focus position of the digital camera 100. That is, when the depth is farther from the focus position, the depth measurement accuracy may decrease due to large blurring with an excessive amount of blurring.

In the phase detection depth map M2, as illustrated in FIG. 3C, it is assumed that the spatial resolution is lower than the spatial resolution of the DFD depth map M1, for example (FIG. 3B). For example, the two-dimensional resolution in the phase detection depth map M2 is limited with the correspondence to the number of the sensor pixels 116 provided in the image sensor 115. In addition, it is considered that a depth measurement accuracy of the phase detection depth map M2 is lower than the depth measurement accuracy of the DFD depth map M1 in the depth range close to the focus position.

On the other hand, it is conceivable that the depth measurement accuracy of the phase detection depth map M2 exceeds the depth measurement accuracy of the DFD depth map M1 outside the above-described depth range. For example, the person 51 out of focus in the captured image Im of FIG. 3A can be detected in the phase detection depth map M2 as illustrated in FIG. 3C. As described above, the phase detection depth map M2 is not limited to a specific depth range, and is considered to have an advantage of a resolution that enables a stable depth measurement accuracy.

Therefore, the digital camera 100 of the present embodiment combines the two depth maps M1 and M2 having different performances as described above to generate a combined depth map M3 having the advantage of the DFD depth map M1 and the advantage of the phase detection depth map M2 (FIG. 3D).

FIG. 3D illustrates a combined depth map M3 obtained from the DFD depth map M1 of FIG. 3B and the phase detection depth map M2 of FIG. 3C. According to the combined depth map M3 of the present embodiment, as illustrated in FIG. 3D, an outer shape of the person 50 in focus can be obtained, and the person 51 out of focus can also be detected, for example.

As described above, the digital camera 100 according to the present embodiment can obtain the combined depth map M3 having the high spatial resolution by the DFD depth map M1 and the stable depth measurement resolution by the phase detection depth map M2. Hereinafter, details of the operation of the digital camera 100 in the present embodiment will be described.

2-1. Overall Operation

Figure 4:
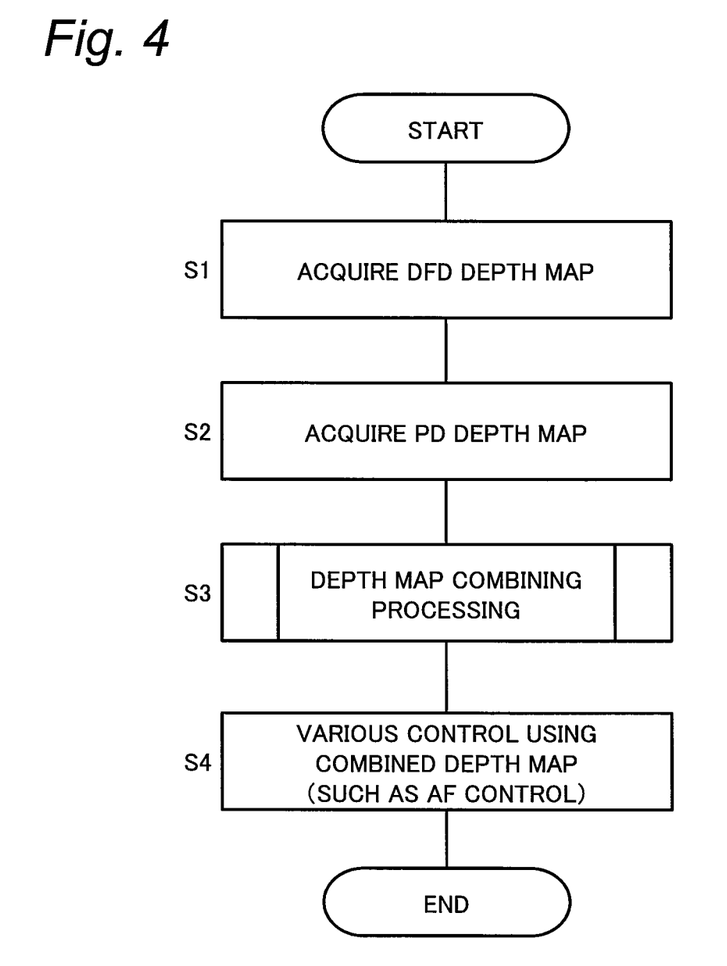
FIG. 4 is a flowchart for explaining an operation of the digital camera.

An overall operation of the digital camera 100 according to the present embodiment will be described with reference to FIG. 4. FIG. 4 is a flowchart for explaining the operation of the digital camera 100.

Processing illustrated in the flowchart of FIG. 4 is performed for each predetermined period such as a frame period with the image sensor 115 executing an image capturing operation of various moving images such as a through image. The processing of this flow is executed by the controller 135 of the digital camera 100, for example.

At first, the controller 135 of the digital camera 100 acquires the DFD depth map M1 from the DFD calculator 121 (S1). The DFD depth map M1 is an example of first depth information having a first spatial resolution.

In step S1, the DFD calculator 121 performs depth measurement by the DFD method to generate the DFD depth map M1, by performing a DFD calculation for each preset depth measurement point on the basis of image data such as captured images of two frames, for example. The DFD calculation is a calculation for deriving a defocus amount (or a subject depth) on the basis of a difference in a blur amount between frames, by e.g. calculating a point spread function, an optical transfer function or the like. A known technique can be appropriately applied to the depth measurement of the DFD method (e.g., JP 2014-063142 A).

Further, the controller 135 acquires the phase detection depth map M2 from the phase detection calculator 122 (S2). The phase detection depth map M2 is an example of second depth information having a second spatial resolution. Note that a processing order of steps S1 and S2 is not particularly limited.

In step S2, the phase detection calculator 122 performs depth measurement of the image plane phase detection method on the basis of sensor signals input from the sensor pixels 116 in the image sensor 115, to generate the phase detection depth map M2. The depth measurement by the image plane phase detection method can be performed by calculating a defocus amount or the like according to a difference between two types of optical images by pupil division from the sensor signals for each depth measurement point by the sensor pixels 116, for example. A known technique can be appropriately applied to the depth measurement of the image plane phase detection method (e.g., JP 2014-063142 A).

Next, the controller 135 of the present embodiment combines the DFD depth map M1 and the phase detection depth map M2, based on the acquired depth maps M1 and M2 (S3). The combined depth map M3 generated in depth map combining processing (S3) is an example of third depth information in the present embodiment.

The depth map combining processing (S3) of the present embodiment generates the combined depth map M3 by comparing data of the depth maps M1 and M2 with each other for each individual region in the captured image Im to adopt more accurate depth data thereto. Details of the processing in step S3 will be described later.

Next, the controller 135 performs various controls in the digital camera 100 using the generated combined depth map M3 (S4). For example, the controller 135 controls an autofocus (AF) operation or displays information such as an AF frame indicating a detection result of a subject to be subjected to the AF operation, based on the combined depth map M3.

After the control using the combined depth map M3 (S4), the controller 135 ends the processing illustrated in this flowchart.

According to the operation of the digital camera 100 described above, from the DFD depth map M1 and the phase detection depth map M2 (S1, S2), the combined depth map M3 with improved spatial resolution and depth measurement resolution can be acquired (S3). Such a highly accurate combined depth map M3 can be used for various controls and the like in the digital camera 100 (S4).

For example, according to a high spatial resolution in the combined depth map M3, in the example of FIGS. 3A to 3D, the digital camera 100 can extract a region along a shape of the person 50. For example, the region extracted in this manner can used for calculation of an AF evaluation value of a contrast AF method or the like, so that it is possible to realize high-accuracy AF control wherein mis-focusing on background and the like are suppressed. Further, by displaying the extracted shape of the person 50 on the display monitor 130 or the like, it is also possible to visualize the high detection accuracy of the digital camera 100 for a user. An example of such visualization processing will be described later.

Furthermore, the digital camera 100 uses the combined depth map M3 for the AF control, so that even a subject appearing small on the captured image Im can be accurately focused, based on the depth data of the high spatial resolution by the DFD depth map M1. Also in the case of re-focusing on the subject away from the focus position, such as the person 51 in FIG. 3A, the AF control can work at high speed over a wide range of the depth measurement resolution by the phase detection depth map M2 in the combined depth map M3.

2-2. Depth Map Combining Processing

The depth map combining processing in step S3 of FIG. 4 will be described with reference to FIGS. 5 and 6.

Figure 5:
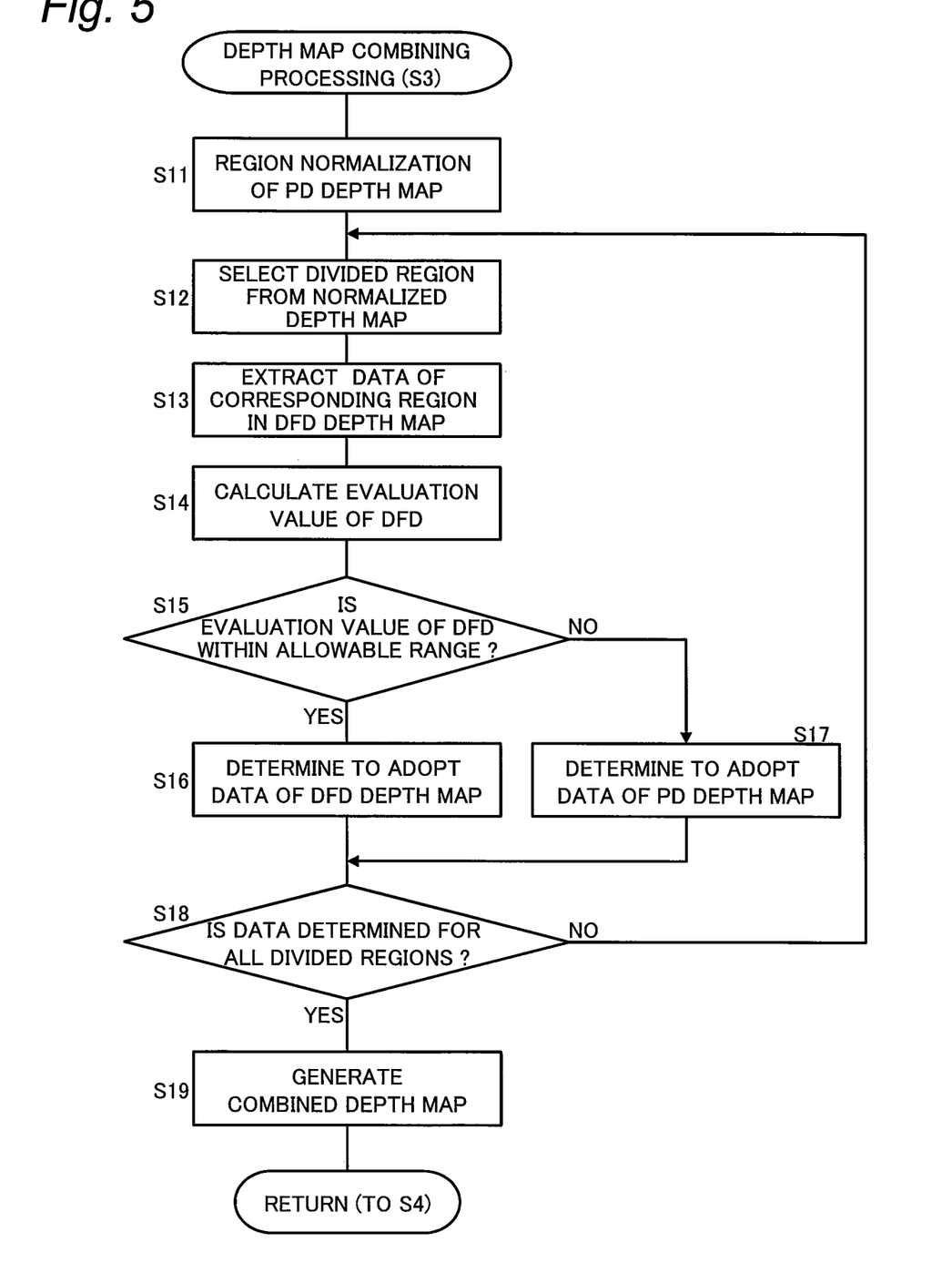
FIG. 5 is a flowchart illustrating depth map combining processing in the digital camera.

FIG. 5 is a flowchart illustrating the depth map combining processing in the digital camera 100. The processing illustrated in this flow is executed by the controller 135 controlling the image processing engine 120, for example.

Figure 6A:
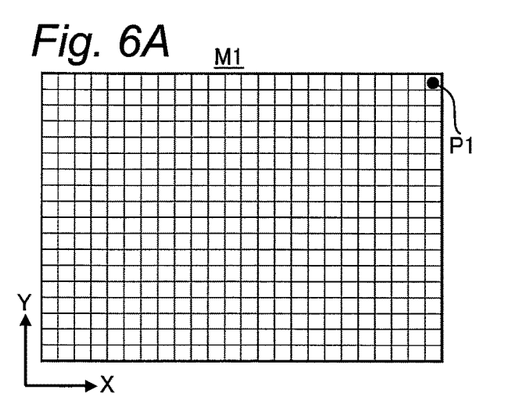
FIGS. 6A to 6E are diagrams for explaining depth map combining processing in the digital camera.
Figure 6B:
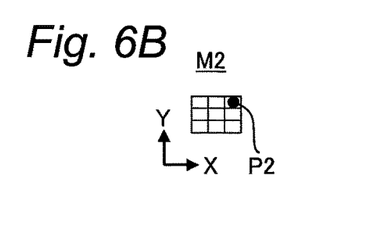

FIGS. 6A and 6B illustrate a DFD depth map M1 and a phase detection depth map M2 before combining, respectively. The process illustrated in FIG. 5 is started in a state where the depth maps M1 and M2 are acquired in steps S1 and S2 in FIG. 4 as illustrated in FIGS. 6A and 6B, for example.

At first, the controller 135 performs processing to normalize a region in the low-resolution phase detection depth map M2 so as to match the high-resolution DFD depth map M1, for example (S11). The processing in step S11 will be described with reference to FIGS. 6A to 6C.

FIGS. 6A and 6B illustrate data points P1 and P2 corresponding to the resolutions of the depth maps M1 and M2, respectively. Each of the data points P1 and P2 has a depth value as a result of depth measurement performed for each depth measurement point at a corresponding position in the captured image Im.

As illustrated in FIG. 6A, the DFD depth map M1 includes a data region having a size including a large number of data points P1 for a high resolution. On the other hand, as illustrated in FIG. 6B, the phase detection depth map M2 includes a data region including N data points P2 smaller than the number of data points P1 of the DFD depth map M1. Therefore, in step S11, the data region of the phase detection depth map M2 is normalized in accordance with the DFD depth map M1.

Figure 6C:
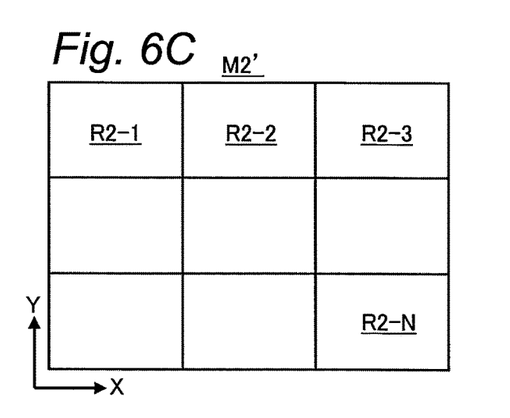

FIG. 6C illustrates a normalized phase detection depth map M2'. The normalized phase detection depth map M2' is configured by dividing a data region having the same size as the DFD depth map M1 into N divided regions R2-1 to R2-N. For example, in step S11, the controller 135 manages the normalized phase detection depth map M2' by allocating the depth value of each data point P2 in the phase detection depth map M2 acquired in step S2 as depth data for each of the divided regions R2-1 to R2-N.

Next, the controller 135 selects one divided region R2 in order from the first to N-th divided regions R2-1 to R2-N in the normalized phase detection depth map M2' (S12). In steps S12 to S18, processing to compare the DFD depth map M1 and the phase detection depth map M2' is sequentially performed for each selected one of divided regions R2.

Figure 6D:
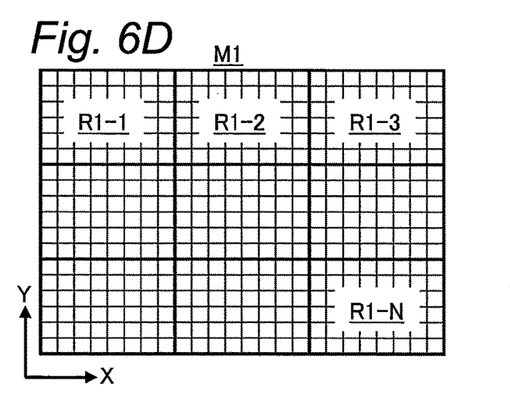

The controller 135 extracts region R1 corresponding to currently selected divided region R2 and its depth data from the DFD depth map M1 (S13). FIG. 6D illustrates corresponding regions R1-1 to R1-N of the first to N-th divided regions R2-1 to R2-N of FIG. 6C in the DFD depth map M1 of FIG. 6A. Each corresponding region R1 of the DFD depth map M1 includes a plurality of data points P1 as a depth measurement result of the same region as the divided region R2 of the corresponding phase detection depth map M2' on the captured image Im.

Based on the depth data in the corresponding region R1 extracted from the DFD depth map M1, the controller 135 calculates an evaluation value of the DFD depth measurement for the currently selected divided region R2, for example (S14). For example, the evaluation value of the DFD depth measurement is an average value over the depth value of each data point P1 in the corresponding region R1 of the DFD depth map M1, and is calculated by an arithmetic mean, a geometric mean, or various weighted means, for example.

Next, as a comparison between the two depth maps M1 and M2' in the currently selected divided region R2, the controller 135 determines whether or not the calculated evaluation value of the DFD depth measurement is within a predetermined allowable range according to the depth data of the phase detection depth map M2', for example (S15). For example, the allowable range is set to a depth range of an allowable error in which the depth value allocated to the divided region R2 being selected in the phase detection depth map M2' and the evaluation value of the DFD depth measurement are presumed to match.

When determining that the evaluation value of the DFD depth measurement for the currently selected divided region R2 falls within the allowable range (YES in S15), the controller 135 determines to adopt the depth data of the corresponding region R1 of the DFD depth map M1 as the combined depth map M3 (S16). In this case, the DFD depth map M1 is not particularly deviated from the phase detection depth map M2', and the depth measurement result of the corresponding region R1 is considered to be highly accurate.

On the other hand, when determining that the evaluation value of the DFD depth measurement for the currently selected divided region R2 is not within the allowable range (NO in S15), the controller 135 determines to adopt the depth data of the phase detection depth map M2' as the combined depth map M3 (S17). In this case, as the DFD depth map M1 is relatively shifted from the phase detection depth map M2', it is possible to detect that the depth measurement accuracy has deterioration due to large blurring or the like in the corresponding region R2.

When the depth data to be adopted is not determined in all the divided regions R2-1 to R2-N (NO in S18), the controller 135 selects a new divided region R2 to perform the processing in and after step S12. As a result, the comparison (S12 to S18) between the two depth maps M1 and M2' is repeated for each divided region R2.

Figure 6E:
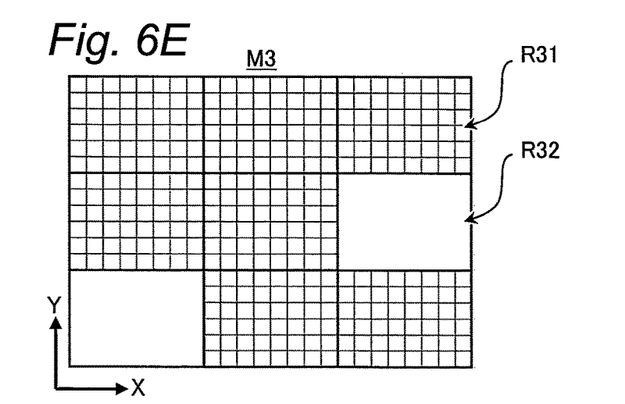

When the depth data to be adopted is determined in all the divided regions R2-1 to R2-N(YES in S18), the controller 135 generates the combined depth map M3 as a combined result of the two depth maps M1 and M2 (S19). FIG. 6E illustrates the combined depth map M3 in step S19.

FIG. 6E illustrates the combined depth map M3 generated from the depth maps M1 and M2' of FIGS. 6C and 6D. The combined depth map M3 includes a DFD region R31 which is a region having depth data of the DFD depth map M1 and a phase detection region R32 which is a region having depth data of the phase detection depth map M2'. For example, the combined depth map M3 is configured by dividing the same data region as the DFD depth map M1 into N divided regions similarly to the corresponding regions R1-1 to R1-N.

For example, in step S19, the controller 135 allocates the depth data of the corresponding region R1 determined in step S16 to the divided region in the DFD region R31 in the combined depth map M3. The controller 135 allocates the depth data of the divided region R2 determined in step S17 to the divided region in the phase detection region R32 in the combined depth map M3. In this manner, the DFD depth map M1 and the phase detection depth map M2' can be combined to generate the combined depth map M3 (S19).

When generating the combined depth map M3 as described above (S19), the controller 135 ends the depth map combining processing (S3 in FIG. 4) and proceeds to the processing of step S4, for example.

According to the depth map combining processing (S3) described above, it is possible to obtain the combined depth map M3 including the DFD region R31 having a higher spatial resolution by the DFD method, and the phase detection region R32 having stable depth measurement accuracy in a wider depth range by the image plane phase detection method (S19).

In addition, the processing of comparing the depth maps M1 and M2 for each of the divided regions R2 of the normalized phase detection depth map M2' and adopting one of the depth data can make it easy to generate the combined depth map M3 (S11 to S19). For example, by comparing the evaluation value of the DFD depth measurement with the depth value of the phase detection depth map M2' for each divided region R2 (S15), it is possible to easily determine whether or not the depth measurement accuracy is deteriorated in the corresponding region R1 of the DFD depth map M1.

The evaluation value of the DFD depth measurement in steps S14 and S15 is not particularly limited to the average value of the depth values in the corresponding region R1, and may be e.g. a mode value, a dispersion degree, or a difference between the maximum value and the minimum value. In addition, the comparison target of the evaluation values of the DFD depth measurement may not be the depth value of the phase detection depth map M2'. For example, reference value for determining a decrease in depth measurement accuracy may be set in advance according to the type of the evaluation value. Furthermore, the digital camera 100 may obtain a depth range which is before and after the vicinity of the focus position wherein it is presumed that the depth measurement accuracy of the DFD method can be obtained with high accuracy, and determine whether or not the depth data of the DFD depth map M1 is within the obtained depth range in step S15 or the like.

In the above description, any one of the two depth maps M1 and M2 is adopted as the combined depth map M3 for each divided region R2 (S16, S17). The digital camera 100 according to the present embodiment is not limited to this, and for example, a portion that adopts the depth data of the DFD depth map M1 and a portion that adopts the depth data of the phase detection depth map M2' may be provided inside the divided region R2.

For example, the controller 135 may determine the presence or absence of a decrease in depth measurement accuracy for each data point P1 in the corresponding region R1 of the DFD depth map M1, and selectively replace the depth data of the data point P1 determined to have a decrease in depth measurement accuracy with the depth data of the phase detection depth map M2'. Alternatively, the digital camera 100 may generate the combined depth map M3 by combining the two depth maps M1 and M2 so as to interpolate the depth data of the data point P2 in the phase detection depth map M2 with the depth data of the data point P1 in the DFD depth map M1.

2-3. Display Processing of AF Frame

An example of processing to visualize, to the user, that the digital camera 100 recognizes the shape of the subject using the combined depth map M3 as described above will be described with reference to FIGS. 7 and 8. Hereinafter, a processing example using the combined depth map M3 for displaying the AF frame will be described.

Figure 7:
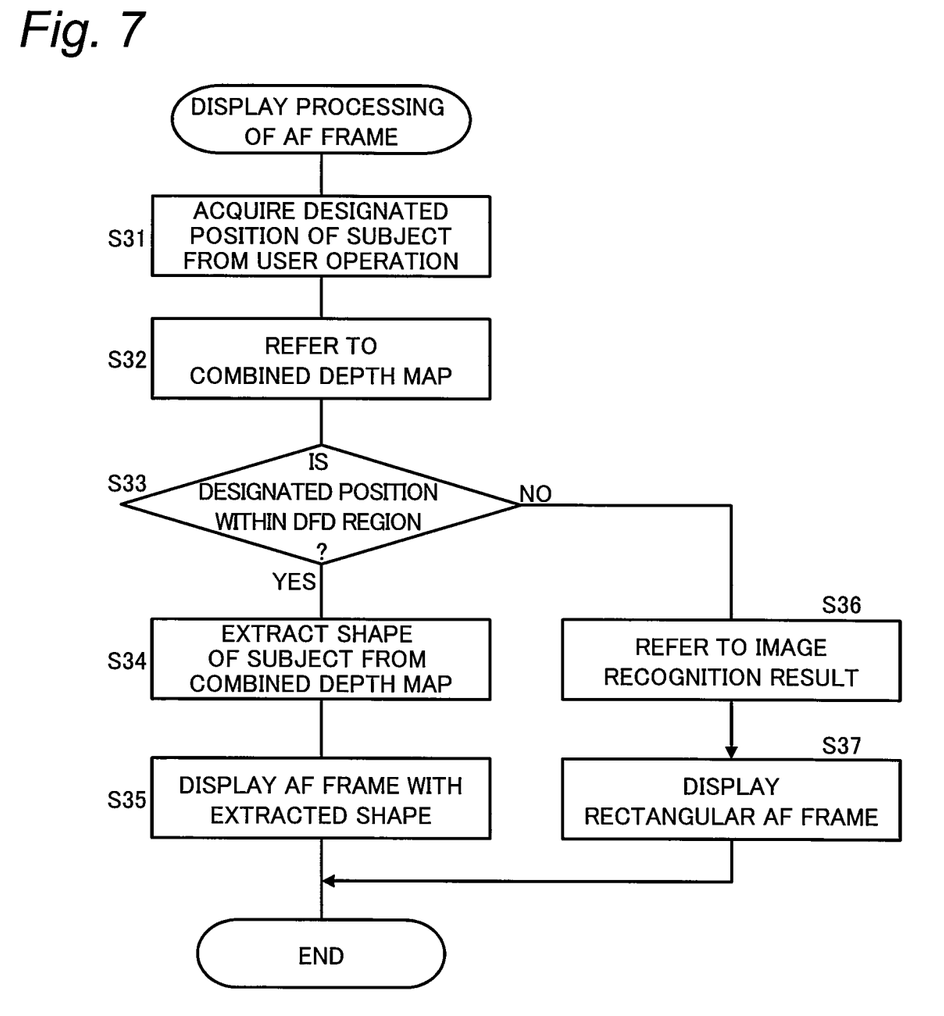
FIG. 7 is a flowchart illustrating display processing of an AF frame in the digital camera.
Figure 8A:
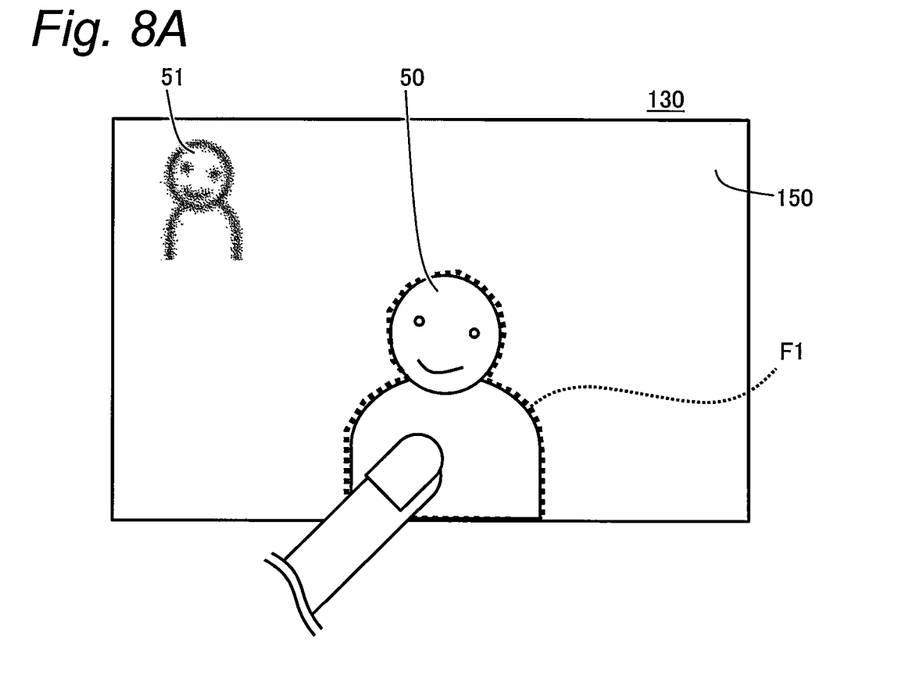
FIGS. 8A and 8B are diagrams illustrating a display example of the AF frame in the digital camera.
Figure 8B:
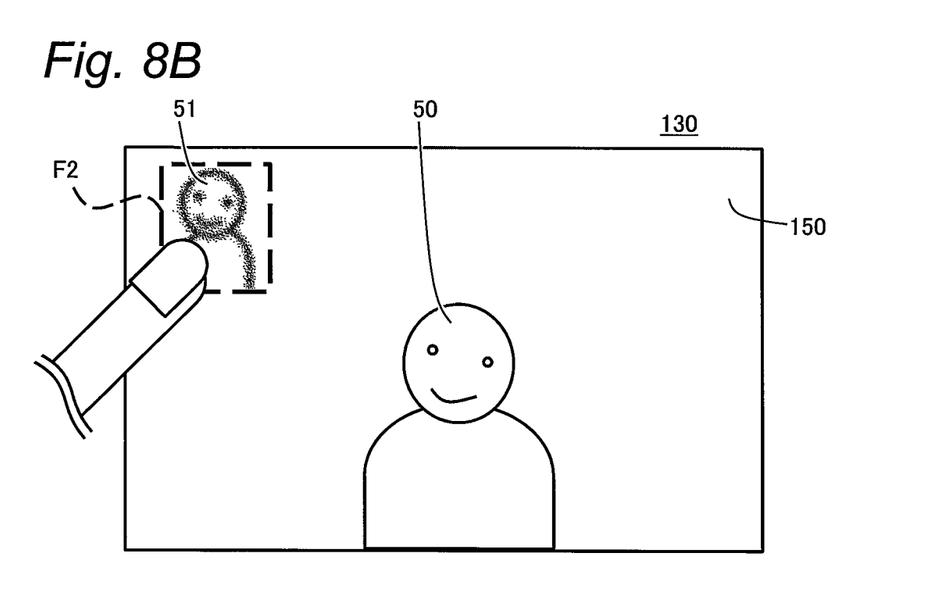

FIG. 7 is a flowchart illustrating display processing of the AF frame in the digital camera 100. FIGS. 8A and 8B are diagrams illustrating a display example of the AF frame in the digital camera 100. The processing illustrated in the flowchart of FIG. 7 is started in response to an input of a predetermined user operation with the combined depth map M3 generated in the digital camera 100 being stored in the buffer memory 125 or the like, for example.

At first, the controller 135 acquires position information designated by a user operation via the user interface 150 of the digital camera 100 (S31). The user operation is various operations for designating a position of a subject desired by the user on the captured image Im such as a live view, and is, for example, a touch operation on a touch panel.

Next, the controller 135 refers to the combined depth map M3 corresponding to the current captured image Im (S32), and determines whether or not the designated position indicated by the acquired position information is within the DFD region R31 (FIG. 6E) in the combined depth map M3, for example (S33).

When the designated position of the user operation is within the DFD region R31 of the combined depth map M3 (YES in S33), the controller 135 extracts the region of the subject including the designated position and the shape thereof, based on the depth data in the combined depth map M3 (S34). For example, the controller 135 performs edge analysis or the like on the depth data of the combined depth map M3 to extract a region along the contour shape of the subject including the designated position. According to the DFD region R31 of the combined depth map M3, the shape of the designated subject can be accurately extracted from the high-resolution depth data.

Next, based on the information extracted from the DFD region R1 of the combined depth map M3, the controller 135 controls the display monitor 130 to display the AF frame F1 having the shape of the extracted subject region, for example (S35). FIG. 8A illustrates a display example of the AF frame F1 in step S35. The AF frame F1 is an example of first detection information.

The example of FIG. 8A illustrates a display example in a case where subjects of the digital camera 100 are a person 50 close to a focus position and a person 51 far from the focus position and a user operation for designating a position of the person 50 is input. In the present example, according to the user operation (S31), the controller 135 of the digital camera 100 extracts the shape of the person 50 from the combined depth map M3 (S34). As a result, the AF frame F1 along the shape of the person 50 is displayed on the display monitor 130 (S35).

Returning to FIG. 7, when the designated position of the user operation is not in the DFD region R31 of the combined depth map M3 (NO in S33), the designated position is in the phase detection region R32. In this case, the controller 135 refers to a result of image recognition separately performed on the captured image Im (S36), and acquires a rectangular region or the like including the designated position, for example. The image recognition in step S36 may be various processes to recognize a position of a part or the whole of a person or various subjects such as an animal, for example.

Next, the controller 135 controls the display monitor 130 to display a rectangular AF frame F2, based on the acquired rectangular region of the image recognition result or the like, for example (S37). FIG. 8B illustrates a display example of the AF frame F2 in step S37. The AF frame F2 is an example of second detection information.

FIG. 8B illustrates a case where the position of the person 51 far from the focus position is designated by the user operation from the persons 50 and 51 of the same subject as in FIG. 8A. At this time, a display format such as a line type of the AF frame F2 may be different from the display format of the AF frame F1 along the shape of the subject. Furthermore, in steps S36 and S37, the controller 135 may arrange the rectangular AF frame F2 by recognizing the position, size, and the like of the subject, based on the depth data of the combined depth map M3.

After the controller 135 causes the AF frames F1 and F2 to be displayed (S35, S37), the processing illustrated in this flowchart ends. At this time, the display of the AF frames F1 and F2 may be updated as needed. For example, the controller 135 may repeat the processing illustrated in this flow at a predetermined cycle. In this case, as the specified position (S31) of the user operation, the position input at the time of execution of the first processing may be used repeatedly. Alternatively, the position of the result of tracking the subject from the first position may be updated. Such tracking of the subject may be performed using the combined depth map M3 obtained sequentially, or may be performed by image recognition as appropriate.

According to the above AF frame display processing, the digital camera 100 can display the AF frame F1 along the shape of the subject for the subject having depth measurable with higher accuracy by the DFD region R31 of the combined depth map M3 (see FIG. 8A). As a result, it is possible to visualize the user that the digital camera 100 recognizes the shape of the subject with high accuracy.

Furthermore, even in a case where the subject designated by the user operation is outside the DFD region R31 (see FIG. 8B), the digital camera 100 can perform focusing on the subject at high speed using the combined depth map M3. Then, in the combined depth map M3 obtained thereafter, the designated subject is expected to be located in the DFD region R1. Therefore, even when displaying the rectangular AF frame F2 on the person 51 initially designated as illustrated in FIG. 8B in response to the input of the user operation, the digital camera 100 may update the shape to be displayed as the AF frame F2 once the shape of the person 51 is extracted by the new combined depth map M3.

In the above steps S33 to S35, an example in which the AF frame F1 along the shape of the subject is displayed when the designated position is in the DFD region R31 in the combined depth map M3 (YES in S33) has been described. When extracting the shape of the subject from the combined depth map M3 (S34), the controller 135 may determine whether or not the contour shape falls within the DFD region R31.

In a case where the shape of the subject extracted as described above does not fit in the DFD region R31, the resolution of the phase detection region R32 is partially included, resulting in reducing recognition accuracy of the shape. In such a case, the controller 135 may display a rectangular AF frame F2 instead of the AF frame F1 along the extracted shape.

Alternatively, the controller 135 may display the AF frame F1 along the extracted shape including the phase detection region R32 as described above, with the line type and the like being changed from the other cases. In this manner, the degree of accuracy of recognition of the shape by the digital camera 100 may be visualized to the user. Furthermore, the shape of the AF frame F1 may not completely match the shape extracted from the combined depth map M3, and interpolation, smoothing, or the like may be appropriately performed.

3. Summary

As described above, the digital camera 100 as an example of the imaging apparatus according to the present embodiment includes the image sensor 115 as an example of the image sensor, the DFD calculator 121 as an example of the first depth measurer, the phase detection calculator 122 as an example of the second depth measurer, and the controller 135. The image sensor 115 captures a subject image to generate image data. The DFD calculator 121 acquires the DFD depth map M1 which is an example of first depth information indicating, at a first spatial resolution, a depth showing a distance between the imaging apparatus and the subject in the image indicated by the image data (S1). The phase detection calculator 122 acquires the phase detection depth map M2 which is an example of second depth information indicating a depth in an image at a second spatial resolution different from the first spatial resolution (S2). On the basis of the DFD depth map M1 and the phase detection depth map M2, the controller 135 acquires the combined depth map M3 which is an example of third depth information indicating a depth in the first or second spatial resolution for each region of different regions in the image (S3).

According to the digital camera 100 described above, the depth to the subject can be accurately obtained by the combined depth map M3 based on the DFD depth map M1 and the phase detection depth map M2 having different spatial resolutions. According to the combined depth map M3, as the spatial resolution of the DFD depth map M1 and the spatial resolution of the phase detection depth map M2 are included for each region on the image, an accurate depth measurement result can be obtained.

In the present embodiment, the combined depth map M3 includes depth information with higher depth measurement accuracy out of the DFD depth map M1 and the phase detection depth map M2 for each region in the image. As a result, highly accurate depth measurement accuracy can be obtained in the combined depth map M3.

In the present embodiment, the depth measurement accuracy of the DFD depth map M1 is higher than that of the phase detection depth map M2 within a specific depth range. The depth measurement accuracy of the phase detection depth map M2 is higher than that of the DFD depth map M1 outside the depth range. The combined depth map M3 includes depth data of the DFD depth map M1 within the depth range and depth data of the phase detection depth map M2 outside the depth range. As a result, the depth data in which the DFD depth map M1 and the phase detection depth map M2 have higher depth measurement accuracy inside and outside the above-described depth range is included in the combined depth map M3, and the depth measurement accuracy of the combined depth map M3 can be improved.

In the present embodiment, the specific depth range is a range including a focus position focused on the image sensor 115. The DFD calculator 121 generates the DFD depth map M1 on the basis of the image data generated by the image sensor 115. In the depth range near the focus position in the digital camera 100, the depth measurement accuracy of the combined depth map M3 can be improved using the depth data of the DFD depth map M1.

In the present embodiment, the spatial resolution (first spatial resolution) of the DFD depth map M1 is higher than the spatial resolution (second spatial resolution) of the phase detection depth map M2 in the two-dimensional direction (X, Y) corresponding to the image. As a result, in the region using the depth data of the DFD depth map M1, high resolution is obtained in the combined depth map M3. On the other hand, the spatial resolution of the phase detection depth map M2 may include a more stable depth measurement resolution than the DFD depth map M1 in the Z direction of the depth.

In the present embodiment, the DFD calculator 121 performs depth measurement by a depth from defocus (DFD) method to generate the DFD depth map M1. The phase detection calculator 122 performs depth measurement by the image plane phase detection method to generate the phase detection depth map M2. The depth maps M1 and M2 based on such different depth measurement methods can be combined to obtain the accurate combined depth map M3.

In the present embodiment, the controller 135 controls the focusing operation to focus on the subject, based on the combined depth map M3 (S4). According to the combined depth map M3, it is possible to easily control the focusing operation by the depth measurement result with high accuracy.

In the present embodiment, the digital camera 100 further includes the display monitor 130 that is an example of a display that displays an image indicated by image data. The controller 135 causes the AF frame F1, which is an example of first detection information having a shape along the subject in the image, to be displayed on the display monitor 130 on the basis of the combined depth map M3 (S35). A highly accurate depth measurement result by the combined depth map M3 can be visualized to the user by the AF frame F1 or the like along the subject, and the digital camera 100 can be easily used.

In the present embodiment, in a case where the subject is located in the DFD region R1 as an example of a region having a first spatial resolution in the combined depth map M3 (YES in S33), the controller 135 displays the AF frame F1 of the first detection information (S35). In a case where the subject is not located in the DFD region R1 in the combined depth map M3 (NO in S33), the controller 135 displays the AF frame F2 as an example of second detection information having a shape different from the first detection information (S37). As a result, when the digital camera 100 can accurately recognize the shape of the subject, the first detection information can be selectively visualized, and the user can easily use the digital camera 100.

In the present embodiment, the digital camera 100 includes the image sensor 115 that captures a subject image and generates image data, the display monitor 130 that displays an image indicated by the image data, and the controller 135 that controls the display monitor 130 on the basis of depth information indicating a depth between the subject in the image indicated by the image data and the imaging apparatus. In a case where the subject is located within a specific depth range (YES in S33), the controller 135 may cause the display monitor 130 to display first detection information having a shape along the subject in the image (S35). As a result, in the digital camera 100, when the shape of the subject can be recognized by accurately obtaining the depth to the subject, such a recognition result can be visualized for the user, and the digital camera 100 can be easily used.

In the present embodiment, when the subject is not located within the depth range (NO in S33), the controller 135 may cause the display monitor 130 to display the second detection information having a shape different from the first detection information (S37). As a result, even when the depth to the subject cannot be obtained accurately or the shape of the subject cannot be recognized in the digital camera 100, the user can easily use the digital camera 100 by the display of the display monitor 130.

OTHER EMBODIMENTS

As described above, the first embodiment has been described as an example of the technique disclosed in the present application. However, the technique in the present disclosure is not limited thereto, and can also be applied to embodiments in which changes, replacements, additions, omissions, and the like are made as appropriate. Further, a new embodiment can be made by combining the components described in the first embodiment.

In the first embodiment described above, the DFD calculator 121 and the phase detection calculator 122 have been exemplified as examples of the first and second depth measurers. In the present embodiment, the first and second depth measurers are not limited thereto, and various configurations using various depth measurement methods can be applied. For example, a time of flight (TOF) method, a range finder, a binocular stereo depth measurement method, a color-discriminated depth measurement method, depth estimation by artificial intelligence such as machine learning, or the like may be applied to each depth measurer. That is, in the present embodiment, the depth information may be acquired by depth measurement of various active sensing methods. Further, an evaluation value of a contrast AF method or the like may be used as the depth information of the present embodiment.

In the above embodiments, an example in which the combined depth map M3 is used for controlling the digital camera 100 has been described. The application of the combined depth map M3 is not limited thereto, and the combined depth map M3 may be used for image processing of various captured images at the time of generating the combined depth map M3, for example. In this case, the combined depth map M3 may be output from the digital camera 100 to the outside together with the image data of the captured image, and may be used for post-processing such as editing of image data including a moving image, for example. Further, the combined depth map M3 may be used for scene recognition or various determination processing.

In the above embodiments, the various depth maps M1 to M3 are exemplified as an example of the first to third depth information. In the present embodiment, the first to third depth information is not limited to the depth map, and may be various information indicating a measurement result of the depth to the subject, such as a three-dimensional point group or a depth image. Furthermore, the various depth information may be represented by various amounts corresponding to the depth to the subject, and may be represented by a defocus amount, for example.

In the above embodiments, the AF frame F1 indicating the shape of the subject is exemplified as the first detection information by using the combined depth map M3 obtained by combining the two depth maps M1 and M2. In the present embodiment, based on not necessarily limited to the combined distance map M3 but the various depth information indicating a depth measurement result with high accuracy to such an extent that the shape of the subject can be extracted, the digital camera 100 may generate the first detection information and display the first detection information on the display.

In the above embodiments, an example has been described in which the AF frame is displayed in response to the input of the designated position by the user operation in the AF frame display processing (FIG. 7). In the present embodiment, the digital camera 100 may display the AF frame without being limited to the input of the user operation, and in this case as well, the shape of the AF frame can be set with reference to the combined depth map M3 as described above. Furthermore, the digital camera 100 may use the combined depth map M3 in the same manner as described above when displaying a display frame for a plurality of subjects, such as a candidate frame of an AF target, in addition to the AF frame for the subject of the AF target. For example, the digital camera 100 may determine whether or not the position where the subject is detected by the image recognition of the captured image Im is the DFD region R31 and set the shape of the display frame. Such a display frame is also an example of the first or second detection information according to the shape thereof.

In the above embodiments, the digital camera 100 including the optical system 110 and the lens driver 112 has been exemplified. The imaging apparatus of the present embodiment may not include the optical system 110 and the lens driver 112, and may be an interchangeable lens type camera, for example.

In the above embodiments, a digital camera is described as an example of the imaging apparatus, but the imaging apparatus is not limited to the digital camera. The imaging apparatus of the present disclosure only has to be electronic equipment having an image capturing function (e.g., a video camera, a smartphone, and a tablet terminal).

In the above, the embodiments are described as examples of the techniques in the present disclosure. For that purpose, the accompanying drawings and the detailed description are provided.

Therefore, the components illustrated in the accompanying drawings and described in the detailed description not only include components essential for solving the problem but also can include, to exemplify the techniques, components that are not essential for solving the problem. For this reason, it should not be immediately recognized that those unnecessary components are necessary only because those unnecessary components are described in the accompanying drawings or the detailed description.

In addition, since the above-described embodiments are intended to illustrate the technique in the present disclosure, various changes, replacements, additions, omissions, and the like can be made within the scope of the claims or equivalents thereof.

The present disclosure is applicable to various imaging apparatuses having a depth measurement function.

The invention claimed is:

1. An imaging apparatus comprising:
an image sensor that captures a subject image to generate image data;
a first depth measurer that acquires first depth information indicating a depth at a first spatial resolution, the depth showing a distance between the imaging apparatus and a subject in an image indicated by the image data;
a second depth measurer that acquires second depth information indicating the depth in the image at a second spatial resolution different from the first spatial resolution; and
a controller that acquires third depth information indicating the depth at the first or second spatial resolution for each region of different regions in the image, based on the first depth information and the second depth information,
wherein the third depth information includes first and second depth regions that are different each other in the image, the first depth regions indicating the depth at the first spatial resolution, and the second depth regions indicating the depth at the second spatial resolution.

2. The imaging apparatus according to claim 1, wherein the third depth information includes, for each region in the image, depth information having higher depth measurement accuracy among the first and second depth information.

3. The imaging apparatus according to claim 1, wherein a depth measurement accuracy of the first depth information is higher than a depth measurement accuracy of the second depth information within a specific depth range, and
outside the depth range, the depth measurement accuracy of the second depth information is higher than the depth measurement accuracy of the first depth information, wherein
the third depth information includes the first depth information within the depth range and the second depth information outside the depth range.

4. The imaging apparatus according to claim 3, wherein the specific depth range is a range including a focus position focused on the image sensor.

5. The imaging apparatus according to claim 1, wherein the first spatial resolution is higher than the second spatial resolution in a two-dimensional direction corresponding to the image.

6. The imaging apparatus according to claim 1, wherein the controller controls a focusing operation to focus on the subject, based on the third depth information.

7. The imaging apparatus according to claim 1, further comprising a display that displays the image indicated by the image data,
wherein the controller causes the display to display first detection information having a shape along the subject in the image, based on the third depth information.

8. The imaging apparatus according to claim 7, wherein the controller
causes the first detection information to be displayed, in a case where the subject is located in a region of the first spatial resolution in the third depth information, and
causes second detection information having a shape different from the first detection information to be displayed, in a case where the subject is not located in the region of the first spatial resolution in the third depth information.

9. A non-transitory computer-readable recording medium storing a program for causing an electronic device to operate as the imaging apparatus according to claim 1.

* * * * *